United States Patent
Shveidel et al.

(10) Patent No.: US 12,197,757 B1
(45) Date of Patent: Jan. 14, 2025

(54) VIRTUAL FEDERATION APPROACH FOR EFFICIENT CPU UTILIZATION IN STORAGE SYSTEMS WITH HIGH NUMBER OF CORES

(71) Applicant: Dell Products L.P., Round Rock, TX (US)

(72) Inventors: Vladimir Shveidel, Pardes-Hana (IL); Amitai Alkalay, Kadima (IL); Steven A. Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/376,528

(22) Filed: Oct. 4, 2023

(51) Int. Cl.
*G06F 3/06* (2006.01)

(52) U.S. Cl.
CPC .......... *G06F 3/0644* (2013.01); *G06F 3/0665* (2013.01); *G06F 3/061* (2013.01); *G06F 3/067* (2013.01)

(58) Field of Classification Search
CPC ...... G06F 3/0644; G06F 3/0665; G06F 3/061; G06F 3/067
See application file for complete search history.

(56) References Cited

U.S. PATENT DOCUMENTS

| | | | | |
|---|---|---|---|---|
| 10,291,708 | B1 * | 5/2019 | Lyon | H04L 67/568 |
| 11,144,252 | B2 | 10/2021 | Shveidel et al. | |
| 11,157,198 | B2 | 10/2021 | Ma et al. | |
| 11,416,265 | B2 | 8/2022 | Raghavan et al. | |
| 11,616,722 | B2 | 3/2023 | Shveidel et al. | |
| 11,687,245 | B2 | 6/2023 | Shveidel et al. | |
| 2008/0209434 | A1 * | 8/2008 | Queck | G06F 9/5033 718/105 |
| 2017/0177254 | A1 * | 6/2017 | Kondou | G06F 11/0724 |
| 2021/0034260 | A1 * | 2/2021 | Lyon | G06F 3/0629 |
| 2021/0325956 | A1 * | 10/2021 | Adsure | G06F 1/3275 |
| 2022/0137819 | A1 * | 5/2022 | Dong | G06F 3/0658 711/170 |
| 2024/0020042 | A1 * | 1/2024 | Shem Tov | G06F 3/0604 |

* cited by examiner

*Primary Examiner* — Ryan Bertram
(74) *Attorney, Agent, or Firm* — BainwoodHuang (57) ABSTRACT

Techniques for providing a virtual federation approach to increasing efficiency of processing circuitry utilization in storage nodes with a high number of cores. The techniques include, for each of two (2) physical nodes, logically partitioning a plurality of cores into a first domain of cores and a second domain of cores. The techniques include designating the first domain of cores of each physical node as belonging to a first virtual node. The techniques include designating the second domain of cores of each physical node as belonging to a second virtual node. The techniques include operating the first virtual nodes on the two (2) underlying physical nodes as a first virtual appliance, and operating the second virtual nodes on the two (2) underlying physical nodes as a second virtual appliance. In this way, scalability and speedup efficiency can be increased in a multi-core processing environment with a high number of cores.

20 Claims, 4 Drawing Sheets

VIRTUAL FEDERATION APPROACH FOR EFFICIENT CPU UTILIZATION IN STORAGE SYSTEMS WITH HIGH NUMBER OF CORES

BACKGROUND

Distributed storage systems include at least two (2) storage processors ("storage nodes") that have shared access to memory objects (e.g., journals, loggers, caches) and storage objects (e.g., volumes (VOLs), virtual volumes (VVOLs), logical units (LUs), filesystems) maintained on one or more storage drives (e.g., solid-state drives (SSDs), hard disk drives (HDDs)). The storage nodes of a distributed storage system are interconnected by a high bandwidth internal network. The storage nodes include processing circuitry with multiple processing cores configured to run storage applications for carrying out storage input/output (IO) operations (e.g., read operations, write operations) in response to storage IO requests (e.g., read requests, write requests) from one or more host or client computers. The performance of the distributed storage system is generally determined by hardware resources (e.g., processing cores, memory, network bandwidth) of the storage nodes, and is typically scaled by increasing the amount of hardware resources available to the storage nodes for carrying out the storage IO operations.

SUMMARY

One approach to scaling the performance of a distributed storage system with at least two (2) storage nodes can include increasing the number of processing cores ("core(s)") in processing circuitry of the storage nodes. Such an approach can have limits, however. For example, Amdahl's Law states that, for a computer program that has serial and parallel portions, the speedup in latency of program execution is limited by the serial portion of the program. As such, for a fixed-size program computation that uses all available cores to their capacity, each new additional core contributes less usable processing power than the previous one. In accordance with Amdahl's Law, as the number of cores is increased, the total processing throughput tends toward the limit of $1/(1-p)$, in which "p" denotes the fraction of program execution time (e.g., parallelized execution time) that would benefit from the increased number of cores. Moreover, if memory and/or network bandwidth are not scaled with the number of cores, then increasing the number of cores may provide even lower returns due to cache thrashing, as well as memory barriers, atomic operations, spinlocks, and so on, which are typically used to guarantee memory consistency in a multi-core processing environment.

Techniques are disclosed herein for providing a virtual federation approach to improving the efficiency of processing circuitry utilization in storage nodes with a high number of cores. The disclosed techniques can be used to implement a virtual federation of two (2) or more virtual storage appliances ("virtual appliance(s)") on a single physical storage appliance having a dual-node architecture, shared memory, and one or more shared storage drives ("shared drive(s)), in which the dual-node architecture includes two (2) physical nodes that have processing circuitry with multiple cores. The disclosed techniques can include logically partitioning the cores of each physical node into a first domain of cores and a second domain of cores. The disclosed techniques can include, for each first domain of cores, logically partitioning the shared memory into an associated first virtual memory space, and logically partitioning each shared drive into an associated first virtual drive. The disclosed techniques can include, for each second domain of cores, logically partitioning the shared memory into an associated second virtual memory space, and logically partitioning each shared drive into an associated second virtual drive. The disclosed techniques can include designating the first domain of cores of each physical node, its associated first virtual memory space, and its associated first virtual drive as a first virtual storage node ("virtual node(s)"). The disclosed techniques can include designating the second domain of cores of each physical node, its associated second virtual memory space, and its associated second virtual drive as a second virtual node. The disclosed techniques can include operating the first virtual nodes implemented on the two (2) underlying physical nodes as a first virtual appliance, and operating the second virtual nodes implemented on the two (2) underlying physical nodes as a second virtual appliance. In this way, a virtual federation of two (2) virtual appliances can be implemented on a single physical storage appliance with a dual-node architecture.

By implementing a virtual federation of two (2) virtual appliances on a single physical storage appliance with a dual-node architecture, in which each virtual appliance includes two (2) virtual nodes implemented on two (2) respective underlying physical nodes, and each virtual node of each virtual appliance has a partitioned number of cores from a different one of the two (2) underlying physical nodes, scalability and speedup efficiency can be improved in a multi-core processing environment with a high number of cores.

In certain embodiments, a method includes, for each of two (2) physical multi-core storage nodes, logically partitioning a plurality of processing cores into a first domain of processing cores and a second domain of processing cores, designating the first domain of processing cores of each physical multi-core storage node as being part of a first virtual storage node, designating the second domain of processing cores of each physical multi-core storage node as being part of a second virtual storage node, operating the first virtual storage nodes implemented on the two (2) respective physical multi-core storage nodes as a first virtual storage appliance of a virtual federation of storage appliances, and operating the second virtual storage nodes implemented on the two (2) respective physical multi-core storage nodes as a second virtual storage appliance of the virtual federation of storage appliances.

In certain arrangements, the two (2) physical multi-core storage nodes are included in a dual node storage appliance, and the dual node storage appliance includes a shared memory. The method further includes logically partitioning the shared memory into a first virtual memory space and a second virtual memory space.

In certain arrangements, the method further includes sharing the first virtual memory space between the first virtual storage nodes implemented on the two (2) respective physical multi-core storage nodes, and sharing the second virtual memory space between the second virtual storage nodes implemented on the two (2) respective physical multi-core storage nodes.

In certain arrangements, the dual node storage appliance includes at least one shared storage drive. The method further includes logically partitioning the shared storage drive into a first virtual storage drive and a second virtual storage drive.

In certain arrangements, the method further includes sharing the first virtual storage drive between the first virtual storage nodes implemented on the two (2) respective physical multi-core storage nodes, and sharing the second virtual storage drive between the second virtual storage nodes implemented on the two (2) respective physical multi-core storage nodes.

In certain arrangements, the method further includes logically partitioning of the plurality of processing cores into a first number of processing cores in the first domain and a second number of processing cores in the second domain, in which the first number of processing cores is equal to the second number of processing cores.

In certain arrangements, the method further includes logically partitioning of the plurality of processing cores into a first number of processing cores in the first domain and a second number of processing cores in the second domain, in which the first number of processing cores is different from the second number of processing cores.

In certain arrangements, the method further includes maintaining one or more processing cores of the respective first domains of processing cores unused.

In certain arrangements, the method further includes maintaining one or more processing cores of the respective second domains of processing cores unused.

In certain arrangements, the method further includes detecting an overload condition at the first virtual storage appliance.

In certain arrangements, the method further includes, in response to detecting the overload condition at the first virtual storage appliance, directing the first virtual storage nodes implemented on the two (2) respective physical multi-core storage nodes to start using at least one of the unused processing cores of the respective first domains of processing cores, and directing the second virtual storage nodes implemented on the two (2) respective physical multi-core storage nodes to stop using at least one of the unused processing cores of the respective second domains of processing cores.

In certain embodiments, a system includes a memory, and processing circuitry configured to execute program instructions out of the memory, for each of two (2) physical multi-core storage nodes, to logically partition a plurality of processing cores into a first domain of processing cores and a second domain of processing cores, to designate the first domain of processing cores of each physical multi-core storage node as being part of a first virtual storage node, to designate the second domain of processing cores of each physical multi-core storage node as being part of a second virtual storage node, to operate the first virtual storage nodes implemented on the two (2) respective physical multi-core storage nodes as a first virtual storage appliance of a virtual federation of storage appliances, and to operate the second virtual storage nodes implemented on the two (2) respective physical multi-core storage nodes as a second virtual storage appliance of the virtual federation of storage appliances.

In certain arrangements, the two (2) physical multi-core storage nodes are included in a dual node storage appliance, the dual node storage appliance includes a shared memory, and the processing circuitry is further configured to execute the program instructions out of the memory to logically partition the shared memory into a first virtual memory space and a second virtual memory space.

In certain arrangements, the processing circuitry is further configured to execute the program instructions out of the memory to share the first virtual memory space between the first virtual storage nodes implemented on the two (2) respective physical multi-core storage nodes, and to share the second virtual memory space between the second virtual storage nodes implemented on the two (2) respective physical multi-core storage nodes.

In certain arrangements, the dual node storage appliance includes at least one shared storage drive, and the processing circuitry is further configured to execute the program instructions out of the memory to logically partition the shared storage drive into a first virtual storage drive and a second virtual storage drive.

In certain arrangements, the processing circuitry is further configured to execute the program instructions out of the memory to share the first virtual storage drive between the first virtual storage nodes implemented on the two (2) respective physical multi-core storage nodes, and to share the second virtual storage drive between the second virtual storage nodes implemented on the two (2) respective physical multi-core storage nodes.

In certain arrangements, the processing circuitry is further configured to execute the program instructions out of the memory to maintain one or more processing cores of the respective first domains of processing cores unused, and to maintain one or more processing cores of the respective second domains of processing cores unused.

In certain arrangements, the processing circuitry is further configured to execute the program instructions out of the memory to detect an overload condition at the first virtual storage appliance.

In certain arrangements, the processing circuitry is further configured to execute the program instructions out of the memory, in response to detecting the overload condition at the first virtual storage appliance, to direct the first virtual storage nodes implemented on the two (2) respective physical multi-core storage nodes to start using at least one of the unused processing cores of the respective first domains of processing cores, and to direct the second virtual storage nodes implemented on the two (2) respective physical multi-core storage nodes to stop using at least one of the unused processing cores of the respective second domains of processing cores.

In certain embodiments, a computer program product includes a set of non-transitory, computer-readable media having instructions that, when executed by processing circuitry, cause the processing circuitry to perform a method including, for each of two (2) physical multi-core storage nodes, logically partitioning a plurality of processing cores into a first domain of processing cores and a second domain of processing cores, designating the first domain of processing cores of each physical multi-core storage node as being part of a first virtual storage node, designating the second domain of processing cores of each physical multi-core storage node as being part of a second virtual storage node, operating the first virtual storage nodes implemented on the two (2) respective physical multi-core storage nodes as a first virtual storage appliance of a virtual federation of storage appliances, and operating the second virtual storage nodes implemented on the two (2) respective physical multi-core storage nodes as a second virtual storage appliance of the virtual federation of storage appliances.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary multi-core storage node that can be included in a dual node storage appliance ("dual node appliance") in the storage environment of FIG. 1a;

FIG. 2 is a block diagram of an exemplary virtual federation of virtual storage appliances ("virtual appliances") that can be implemented on the dual node appliance of FIG. 1a.

DETAILED DESCRIPTION

Techniques are disclosed herein for providing a virtual federation approach to improving the efficiency of processing circuitry utilization in storage nodes with a high number of processing cores ("core(s)"). The disclosed techniques can include, for each of two (2) physical nodes, logically partitioning a plurality of cores into a first domain of cores and a second domain of cores. The disclosed techniques can include designating the first domain of cores of each physical node as part of a first virtual storage node ("virtual node(s)"), and designating the second domain of cores of each physical node as part of a second virtual node. The disclosed techniques can include operating the first virtual nodes implemented on the two (2) underlying physical nodes as a first virtual storage appliance ("virtual appliance(s)"), and operating the second virtual nodes implemented on the two (2) underlying physical nodes as a second virtual appliance. In this way, a virtual federation of two (2) virtual appliances can be implemented on a single physical storage appliance with a dual-node architecture, thereby improving scalability and speedup efficiency in a multi-core processing environment with a high number of cores.

Figure 1A:
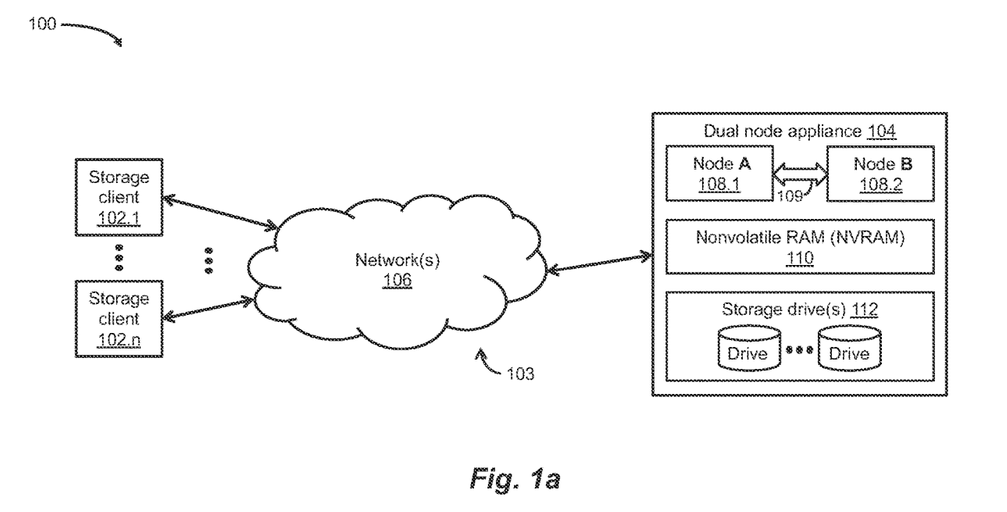
FIG. 1a is a block diagram of an exemplary storage environment, in which techniques can be practiced for providing a virtual federation approach to improving the efficiency of processing circuitry utilization in storage nodes with a high number of processing cores ("core(s)")

FIG. 1a depicts an illustrative embodiment of an exemplary storage environment 100, in which techniques can be practiced for providing a virtual federation approach to improving the efficiency of processing circuitry utilization in storage nodes with a high number of cores. As shown in FIG. 1a, the storage environment 100 can include a plurality of host or client computers ("storage clients") 102.1, . . . , 102.n, a dual node storage appliance ("dual node appliance") 104, and a communications medium 103 that includes at least one network 106. An example of the dual node appliance 104 includes the PowerStore® data storage system sold by Dell EMC Corp., Hopkinton, Massachusetts USA, though certain embodiments are not so limited. As a further example, each of the storage clients 102.1, . . . , 102.n can be configured as an email server computer, a file server computer, a web server computer, and/or any other suitable computer or computerized device. The storage clients 102.1, . . . , 102.n can be part of an enterprise computer system, a cloud based computer system, or any other suitable arrangement of storage clients associated users of the dual node appliance 104. The storage clients 102.1, . . . , 102.n can be configured to provide, over the network(s) 106, storage input/output (IO) requests (e.g., small computer system interface (SCSI) commands, network file system (NFS) commands) to the dual node appliance 104. In response to the storage IO requests (e.g., read requests, write requests), the dual node appliance 104 can perform storage IO operations (e.g., read operations, write operations) that cause data blocks, data files, data pages, and/or any other suitable data elements specified in the storage IO requests to be read from or written to volumes (VOLs), virtual volumes (VVOLs), logical units (LUs), filesystems, or any other suitable storage objects maintained on one or more storage drives ("drives") 112 of the dual node appliance 104.

The communications medium 103 can be configured to interconnect the storage clients 102.1, . . . , 102.n with the dual node appliance 104 to enable them to communicate and exchange data and control signaling. As shown in FIG. 1a, the communications medium 103 can be illustrated as a "cloud" to represent different network topologies, such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

The dual node appliance 104 can include at least two (2) storage processors ("storage node(s)" or "node(s)") such as a node A 108.1 and a node B 108.2, a shared (or partitioned) memory 110 such as a nonvolatile random access memory (NVRAM), and one or more shared (or partitioned) drives 112 such as solid-state drives (SSDs) and hard disk drives (HDDs). The drives 112 can be configured to store VOLs, VVOLs, LUs, filesystems, or any other suitable storage objects for hosting data storage of client applications (e.g., email applications, file applications, web applications) running on the storage clients 102.1, . . . , 102.n. The node A 108.1 and the node B 108.2 can be interconnected by a high bandwidth internal network 109.

Figure 1B:
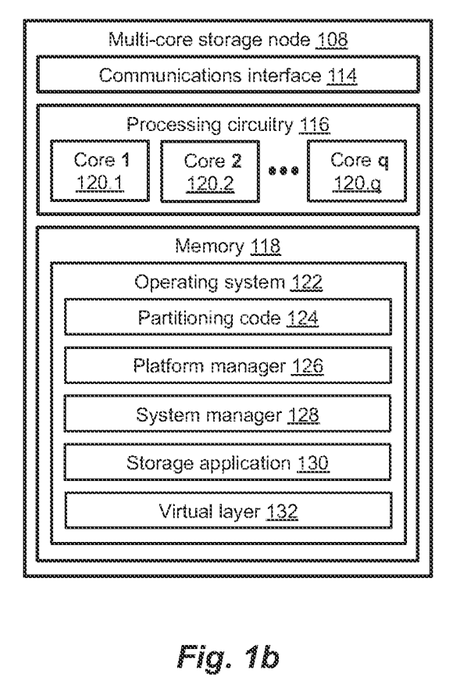

FIG. 1b depicts an exemplary configuration of a multi-core storage node 108. It is noted that each of the node A 108.1 and the node B 108.2 of the dual node appliance 104 (see FIG. 1a) can be configured like the multi-core storage node 108 of FIG. 1b. As shown in FIG. 1b, the multi-core storage node 108 can include a communications interface 114, processing circuitry 116, and a memory 118. The communications interface 114 can include an Ethernet interface, an InfiniBand interface, a Fiber Channel interface, and/or any other suitable communications interface, as well as SCSI target adapters, network interface adapters, and/or any other suitable adapters for converting electronic, optical, and/or wireless signals received over the network(s) 106 to a form suitable for use by the processing circuitry 116. The processing circuitry 116 (e.g., central processing unit (CPU)) can include a set of cores (e.g., CPU cores), namely, a core "1" 120.1, a core "2" 120.2, and so on, up to a core "q" 120.q, in which "q" can be equal to eight (8), sixteen (16), thirty-two (32), sixty-four (64), one hundred twenty-eight (128), or any other suitable number.

The memory 118 can include persistent memory (e.g., flash memory, magnetic memory) and non-persistent memory (e.g., dynamic random-access memory (DRAM), static random-access memory (SRAM)). The memory 118 can store an operating system (OS) 122 such as a Linux OS, Unix OS, Windows OS, or any other suitable OS, as well as one or more software constructs realized in the form of code and data such as partitioning code 124, a platform manager 126, a system manager 128, a storage application 130, and a virtual software layer ("virtual layer") 132. The partitioning code 124 can be configured to perform core partitioning tasks, memory partitioning tasks, and drive partitioning tasks. The platform manager 126 can be configured, upon a failure (or insertion) of one of the drives 112 (see FIG. 1a), to notify the system manager 128, as well as all virtual nodes that share the same underlying physical nodes A 108.1, B 108.2, regarding the drive failure (or insertion). In one embodiment, the platform manager 126 can be implemented as a separate singleton instance shared among all the virtual nodes. Such virtual nodes implemented on the underlying physical nodes A 108.1, B 108.2 are further described herein with reference to an illustrative example.

The system manager 128 can be configured to receive and aggregate notification data from platform managers of respective storage nodes, and in response to the notification data, to take appropriate actions such as issuing, to a data path component, a command to remove (or add) a drive or path from (or to) a data path backend. In one embodiment, the system manager 128 can be implemented as a singleton instance configured to migrate between storage nodes in response to a failover event. The storage application 130 can be configured to run on the OS 122 to handle the storage functionality of the storage nodes, as well as communicate and sync with the same storage application running on one or more peer nodes (e.g., node A 108.1, node B 108.2; see FIG. 1a), thereby providing consistent high availability (HA) data storage service. As described herein, the dual node appliance 104 can include the shared (or partitioned) memory 110 and the shared (or partitioned) drives 112. As such, the virtual layer 132 can be configured to provide the storage application 130 running on the multi-core storage node 108 visibility of its associated memory and drive partitions.

Figure 1C:
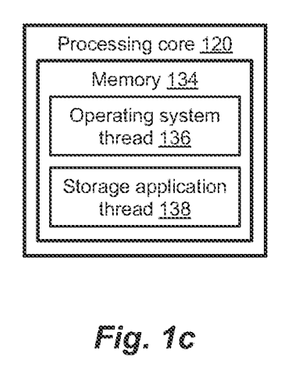
FIG. 1c is a block diagram of an exemplary core from among multiple cores that can be included in the multi-core storage node of FIG. 1b.

FIG. 1c depicts an exemplary configuration of a processing core ("core") 120. It is noted that each of the cores 1-$q$ 120.1-120.$q$ of the multi-core storage node 108 (see FIG. 1b) can be configured like the core 120 of FIG. 1c. As shown in FIG. 1c, the core 120 can include a memory 134 configured to store multiple core threads, including an operating system (OS) thread 136 of the OS 122 and a storage application thread 138 of the storage application 130. An OS thread like the OS thread 136 can be configured to run on each of the cores 1-$q$ 120.1-120.$q$ of the multi-core storage node 108. Further, a storage application thread like the storage application thread 138 can be configured to run on the OS thread of each respective core 1-$q$ 120.1-120.$q$.

In the context of the processing circuitry 116 being configured to execute specialized code and data (e.g., program instructions) out of the memory 118, a computer program product can be configured to deliver all or a portion of the program instructions and/or data to the processing circuitry 116. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 116, the various techniques and/or methods disclosed herein.

One approach to scaling the performance of a distributed storage system such as the dual node appliance 104 can include increasing the number of cores 1-$q$ 120.1-120.$q$ included in the processing circuitry 116 of the respective nodes A 108.1, B 108.2. Such an approach can have limits, however. For example, Amdahl's Law states that, for a computer program that has serial and parallel portions, the speedup in latency of program execution may be limited by the serial portion of the program. As such, for a fixed-size program computation that uses all available cores to their capacity, Amdahl's Law can demonstrate the law of diminishing returns, such that each new additional core contributes less usable processing power than the previous one. Using a scaling factor of 99%, exemplary "speedups gained" in response to increasing the "number of cores" can be expressed in the TABLE below, as follows:

TABLE

| Number of cores | Speedup gained |
| --- | --- |
| 8 | ×7.5 |
| 16 | ×13.9 |
| 32 | ×24.4 |
| 64 | ×39.3 |
| 128 | ×56.4 |

As shown in the TABLE above, if the number of cores is increased by a factor of two (2) (e.g., from 32 to 64), then the speedup gained can increase by a factor less than 2 (e.g., from ×24.4 to ×39.3). Moreover, if memory and/or network bandwidth are not scaled with the number of cores, then increasing the number of cores can provide even lower returns due to cache thrashing, as well as memory barriers, atomic operations, spinlocks, and so on, which are typically used to guarantee memory consistency in a multi-core processing environment.

During operation, the disclosed techniques can improve the efficiency of processing circuitry utilization in storage nodes with a high number cores. The disclosed techniques can be used to implement a virtual federation of two (2) virtual appliances implemented on the dual node appliance 104 (see FIG. 1a), which can include the node A 108.1, the node B 108.2, the shared memory (e.g., NVRAM) 110, and the shared drives 112. The disclosed techniques can include logically partitioning the set of cores 1-$q$ 120.1-120.$q$ of each physical node A 108.1, B 108.2 into a first subset or domain of cores and a second subset or domain of cores. The disclosed techniques can include, for each first domain of cores, logically partitioning the shared memory 110 into an associated first virtual memory space, and logically partitioning each shared drive 112 into an associated first virtual drive. The disclosed techniques can include, for each second domain of cores, logically partitioning the shared memory 110 into an associated second virtual memory space, and logically partitioning each shared drive 112 into an associated second virtual drive. The disclosed techniques can include designating the first domain of cores of each physical node A 108.1, B 108.2, its associated first virtual memory space, and its associated first virtual drive as a first virtual node. The disclosed techniques can include designating the second domain of cores of each physical node A 108.1, B 108.2, its associated second virtual memory space, and its associated second virtual drive as a second virtual node. The disclosed techniques can include operating the first virtual nodes implemented on the two (2) underlying physical nodes A 108.1, B 108.2 as a first virtual appliance, and operating the second virtual nodes implemented on the two (2) underlying physical nodes A 108.1, B 108.2 as a second virtual appliance. In this way, a virtual federation of two (2) virtual appliances can be implemented on the dual node appliance 104.

By implementing a virtual federation of two (2) virtual appliances on a single physical storage appliance with a dual-node architecture, in which each virtual appliance includes two (2) virtual nodes implemented on two (2) respective underlying physical nodes, and each virtual node of each virtual appliance has a partitioned number of cores from a different one of the two (2) underlying physical nodes, scalability and speedup efficiency can be improved in a multi-core processing environment with a high number of cores.

Figure 2:
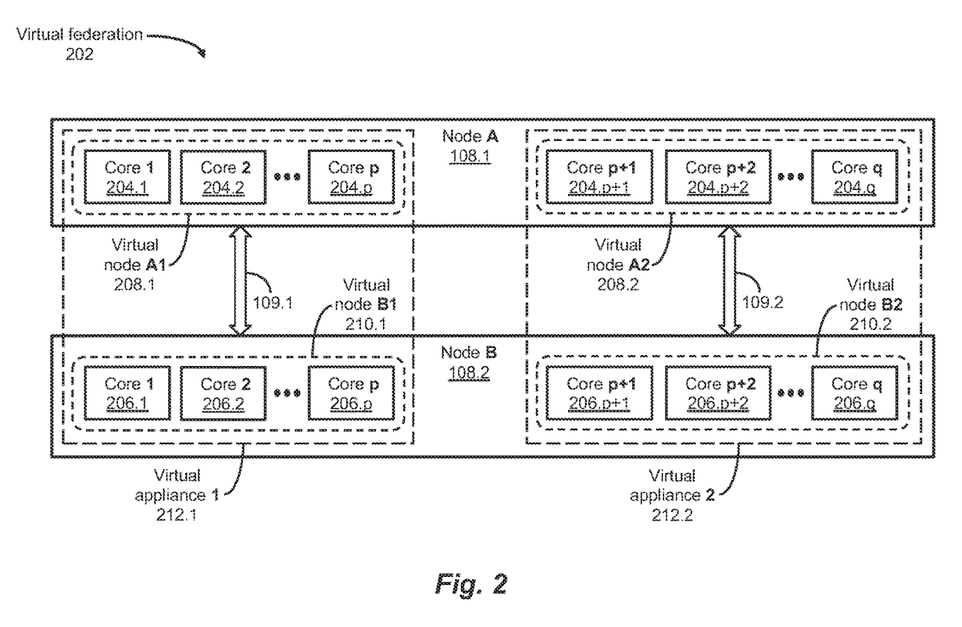

The disclosed techniques will be further understood with reference to the following illustrative example, and FIGS. 1*a*, 1*b*, and 2. In this example, it is assumed that each of the nodes A 108.1, B 108.2 of the dual node appliance 104 (see FIG. 1*a*) includes multiple cores 1-$q$, in which "q" corresponds to an integer value equal to 64 (or any other suitable value). As shown in the TABLE above, the speedup gained in response to increasing the number of cores to 32 can be expressed as ×24.4, and the speedup gained in response to increasing the number of cores to 64 can be expressed as ×39.3. As described herein, for a fixed-size program computation that uses all available cores to their capacity, Amdahl's Law can demonstrate the law of diminishing returns, as can be seen when the number of cores is increased by a factor of 2 (e.g., from 32 to 64), resulting in an increase in the speedup gained by a factor less than 2 (e.g., from ×24.4 to ×39.3). In this example, the problem of diminishing returns, among others, are addressed by providing a virtual federation of virtual appliances implemented on the underlying dual node appliance 104, in which the cores 1-$q$ (q=64) of each node A 108.1, B 108.2 are logically partitioned into a first domain of cores and a second domain of cores.

FIG. 2 depicts an exemplary virtual federation 202 of virtual appliances that can be implemented on the underlying dual node appliance 104 of FIG. 1*a*. As shown in FIG. 2, the virtual federation 202 can be implemented across the node A 108.1 and the node B 108.2, in which the node A 108.1 includes multiple cores 1-$q$ 204.1-204.*q* (q=64) and the node B 108.2 includes multiple cores 1-$q$ 206.1-206.*q* (q=64). In this example, to provide the virtual federation 202 of virtual appliances, processing circuitry (e.g., processing circuitry 116; see FIG. 1*b*) of the node A 108.1 executes partitioning code (e.g., partitioning code 124; see FIG. 1*b*) to logically partition the cores 1-$q$ 204.1-204.*q* (q=64) into two (2) core domains, namely, a first domain of cores "1" to "p" 204.1, 204.2, . . . , 204.*p* and a second domain of cores "p+1" to "q" 204.*p*+1, 204.*p*+2, . . . , 204.*q*, in which "p" corresponds to an integer value equal to 32 (or any other suitable value). Likewise, processing circuitry (e.g., processing circuitry 116; see FIG. 1*b*) of the node B 108.2 executes partitioning code (e.g., partitioning code 124; see FIG. 1*b*) to logically partition the cores 1-$q$ 206.1-206.*q* (q=64) into two (2) core domains, namely, a first domain of cores "1" to "p" 206.1, 206.2, . . . , 206.*p* and a second domain of cores "p+1" to "q" 206.*p*+1, 206.*p*+2, . . . , 206.*q*, in which "p" corresponds to an integer value equal to 32 (or any other suitable value). In addition, the processing circuitry of the node A 108.1 executes the partitioning code to logically partition the shared memory (e.g., NVRAM) 110 into a first virtual memory space and a second virtual memory space, and to logically partition each drive 112 into a first virtual drive and a second virtual drive.

Having logically partitioned the cores 1-$q$ 204.1-204.*q* of node A 108.1, the shared memory 110, and the shared drives 112, the first domain of cores "1" to "p" 204.1, . . . , 204.*p* of node A 108.1, the first virtual memory space, and the first virtual drive of each drive 112 are designated for operation as a virtual node A1 208.1. Further, the second domain of cores "p+1" to "q" 204.*p*+1, . . . , 204.*q* of node A 108.1, the second virtual memory space, and the second virtual drive of each drive 112 are designated for operation as a virtual node A2 208.2. In addition, having logically partitioned the cores 1-$q$ 206.1-206.*q* of node B 108.2, the shared memory 110, and the shared drives 112, the first domain of cores "1" to "p" 206.1, . . . , 206.*p* of node B 108.2, the first virtual memory space, and the first virtual drive of each drive 112 are designated for operation as a virtual node B1 210.1. Further, the second domain of cores "p+1" to "q" 206.*p*+1, . . . , 206.*q* of node B 108.2, the second virtual memory space, and the second virtual drive of each drive 112 are designated for operation as a virtual node B2 210.2.

In this example, the virtual federation 202 is ultimately implemented on the dual node appliance 104 by establishing an interconnection between the virtual node A1 208.1 and the virtual node B1 210.1 by a high bandwidth internal network 109.1, establishing an interconnection between the virtual node A2 208.2 and the virtual node B2 210.2 by a high bandwidth internal network 109.2, designating the virtual node A1 208.1 and the virtual node B1 210.1 for operation as a virtual appliance "1" 212.1, and designating the virtual node A2 208.2 and the virtual node B2 210.2 for operation as a virtual appliance "2" 212.2.

As described herein with reference to the TABLE above, for a fixed-size program computation that uses all available cores to their capacity, Amdahl's Law can demonstrate the law of diminishing returns. For example, when the number of cores is increased from 32 to 64 (i.e., by a factor of 2), the speedup gained may increase from ×24.4 to ×39.3 (i.e., by a factor of less than 2). In this example, such a problem of diminishing returns, among others, are addressed by effectively splitting each 64-core node A 108.1, B 108.2 into two subsets or domains, in which each domain corresponds to a respective 32-core virtual node, and forming the two (2) virtual appliances "1" 212.1, "2" 212.2, in which each virtual appliance includes two (2) 32-core virtual nodes implemented on different ones of the underlying physical nodes A 108.1, B 108.2. As a result, in this example, the speedup gained is increased from ×39.3 for each 64-core node A 108.1, B 108.2, to twice the speedup gained for each 32-core virtual node, namely, 2×(×24.4) or ×48.8.

Figure 3:
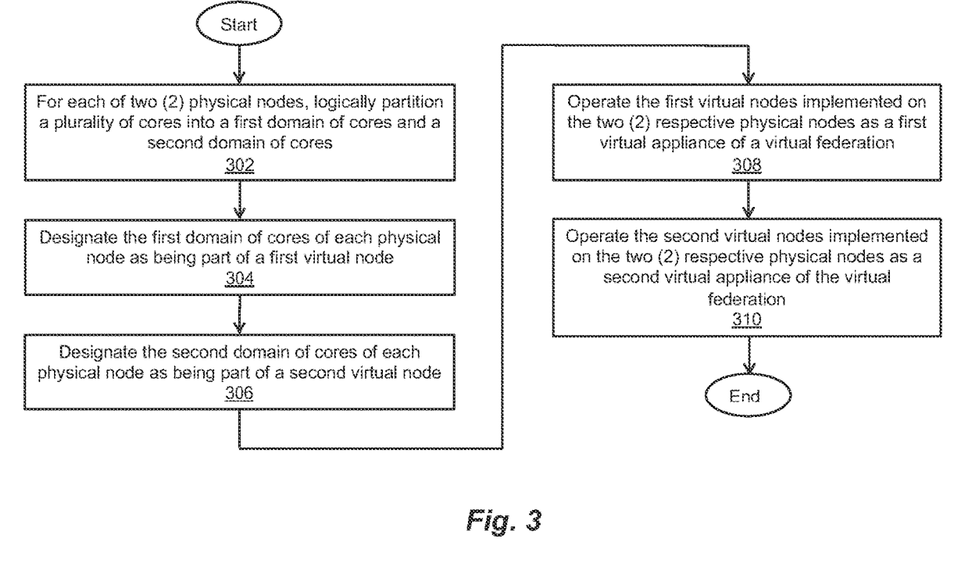
FIG. 3 is a flow diagram of an exemplary method of providing a virtual federation approach to improving the efficiency of processing circuitry utilization in storage nodes with a high number of cores.

A method of providing a virtual federation approach to improving the efficiency of processing circuitry utilization in storage nodes with a high number of cores is described below with reference to FIG. 3. As depicted in block 302, for each of two (2) physical nodes, a plurality of cores are logically partitioned into a first domain of cores and a second domain of cores. As depicted in block 304, the first domain of cores of each physical node is designated as being part of a first virtual node. As depicted in block 306, the second domain of cores of each physical node is designated as being part of a second virtual node. As depicted in block 308, the first virtual nodes implemented on the two (2) respective physical nodes are operated as a first virtual appliance of a virtual federation. As depicted in block 310, the second virtual nodes implemented on the two (2) respective physical nodes are operated as a second virtual appliance of the virtual federation. In this way, a virtual federation of two (2) virtual appliances can be implemented on a single physical storage appliance with a dual-node architecture, thereby improving scalability and speedup efficiency in a multi-core processing environment with a high number of cores.

Having described the above illustrative embodiments, various alternative embodiments and/or variations may be made and/or practiced. For example, it was described herein that the set of cores 1-$q$ 120.1-120.$q$ of each physical node A 108.1, B 108.2 may be logically partitioned into a first domain of cores and a second domain of cores. In one embodiment, the set of cores 1-$q$ 120.1-120.$q$ of each physical node A 108.1, B 108.2 can be logically partitioned down to a socket granularity. For example, if such a physical node includes a set of sixty-four (64) cores, a dual-socket motherboard, and two (2) CPUs, then the physical node may have one (1) thirty-two (32) core domain per socket.

It was further described herein that processing circuitry of the node A 108.1 can execute partitioning code to logically partition the cores 1-$q$ 204.1-204.$q$ (q=64) into two (2) core domains, namely, a first domain of cores "1" to "p" 204.1, . . . , 204.$p$ and a second domain of cores "p+1" to "q" 204.$p$+1, . . . , 204.$q$, in which "p" corresponds to an integer value equal to 32 (or any other suitable value). Likewise, processing circuitry of the node B 108.2 can execute partitioning code to logically partition the cores 1-$q$ 206.1-206.$q$ (q=64) into two (2) core domains, namely, a first domain of cores "1" to "p" 206.1, . . . , 206.$p$ and a second domain of cores "p+1" to "q" 206.$p$+1, . . . , 206.$q$, in which "p" corresponds to an integer value equal to 32 (or any other suitable value). In other words, the partitioning code can be executed to obtain symmetric partitioning of the cores 1-$q$ 204.1-204.$q$ and the cores 1-$q$ 206.1-206.$q$. In one embodiment, the partitioning code can be executed to obtain asymmetric partitioning of the cores 204.1-204.$q$ and the cores 1-$q$ 206.1-206.$q$. Such asymmetric partitioning of cores can be useful for storage applications that involve asymmetric volume groups. In one embodiment, the partitioning code can be executed to effectively transition or move one or more cores from one domain to another domain. It is noted that asymmetric partitioning of virtual memory spaces and virtual drives can also be performed.

It was further described herein that the storage application 130 can be configured to handle storage functionality of virtual appliances, as well as communicate and sync with the same storage application running on one or more peer nodes (e.g., node A 108.1, node B 108.2; see FIG. 1$a$), thereby providing consistent high availability (HA) service among the virtual appliances. In one embodiment, in the event of a software failure in a virtual node of a virtual appliance (e.g., virtual node A1 208.1 of virtual appliance "1" 212.1; see FIG. 2), an HA failover (or failback) can occur within the virtual appliance without affecting the other virtual node (e.g., virtual node A2 208.2 of virtual appliance "2" 212.2; see FIG. 2) implemented on the same underlying physical node (e.g., node A 108.1). In the event of a hardware failure, a kernel failure, or a platform manager failure, all virtual nodes implemented on the same underlying physical node can fail. In this case, an independent HA failover (or failback) can occur within each virtual appliance associated with the failed virtual nodes, without requiring synchronization of storage of the virtual appliances. It is noted, however, that synchronization of storage can be performed after a non-disruptive upgrade (NDU) and/or node reboot to avoid any undesirable HA events and to assure high system reliability.

It was further described herein that the platform manager 126 of the multi-core storage node 108 can be configured, upon a failure (or insertion) of one of the drives 112 (see FIG. 1$a$), to notify the system manager 128, as well as all virtual nodes of virtual appliances that share the same underlying physical nodes, regarding the drive failure (or insertion). In one embodiment, once such notifications have been issued, each virtual node can execute a rebuild flow for their associated virtual drives. Further, once the rebuild flows have been executed and completed, the platform managers of the respective virtual nodes can operate to synchronize storage of the virtual appliances.

It was further described herein that the partitioning code (e.g., partitioning code 124; see FIG. 1$b$) can be executed to effectively transition or move one or more cores from one domain to another domain of a multi-core storage node (e.g., multi-core storage node 108; see FIG. 1$b$). In one embodiment, such effective transitioning or movement of cores between domains of a multi-core storage node can be performed as part of an adaptive load balancing technique to address a situation where storage of one virtual appliance (e.g., virtual appliance "1" 212.1; see FIG. 2) is overloaded while storage of a peer appliance (e.g., virtual appliance "2" 212.2; see FIG. 2) is less loaded or idle. For example, while logically partitioning cores (e.g., cores 1-$q$ 204.1-204.$q$; see FIG. 2) into a first domain and a second domain of a multi-core storage node, one or more additional cores may be included in the respective domains and remain idle and unused until an overload condition is detected at a virtual appliance. For example, such an overload condition may be detected when a current workload of a virtual appliance exceeds a specified threshold. Upon detection of the overload condition, the adaptive load balancing technique can be performed by the multi-core storage node to direct a virtual node of the overloaded virtual appliance to start using a specified number (e.g., one (1) or more) of additional cores in its domain, and to direct a node of the less loaded virtual appliance to stop using the same specified number of cores in its domain, thereby maintaining a constant number of active cores within the multi-core storage node.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for block-based, file-based, or other object-based storage. Such a storage array may include, for example, dedicated storage hardware containing HDDs, SSDs, and/or all-flash drives.

As employed herein, the term "storage entity" may refer to a filesystem, an object storage, a virtualized device, a logical unit (LUN), a logical volume (LV), a logical device, a physical device, and/or a storage medium.

As employed herein, the term "LUN" may refer to a logical entity provided by a storage system for accessing data from the storage system and may be used interchangeably with a logical volume (LV). The term "LUN" may also refer to a logical unit number for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume."

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a read request or a write request.

As employed herein, the terms, "such as," "for example," "e.g.," "exemplary," and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
    for each of two (2) physical multi-core storage nodes, logically partitioning a plurality of processing cores into a first domain of processing cores and a second domain of processing cores;
    designating the first domain of processing cores of each physical multi-core storage node as being part of a first virtual storage node;
    designating the second domain of processing cores of each physical multi-core storage node as being part of a second virtual storage node;
    operating the first virtual storage nodes implemented on the two (2) respective physical multi-core storage nodes as a first virtual storage appliance of a virtual federation of storage appliances; and
    operating the second virtual storage nodes implemented on the two (2) respective physical multi-core storage nodes as a second virtual storage appliance of the virtual federation of storage appliances.

2. The method of claim 1 wherein the two (2) physical multi-core storage nodes are included in a dual node storage appliance, wherein the dual node storage appliance includes a shared memory, and wherein the method further comprises:
    logically partitioning the shared memory into a first virtual memory space and a second virtual memory space.

3. The method of claim 2 further comprising:
    sharing the first virtual memory space between the first virtual storage nodes implemented on the two (2) respective physical multi-core storage nodes; and
    sharing the second virtual memory space between the second virtual storage nodes implemented on the two (2) respective physical multi-core storage nodes.

4. The method of claim 3 wherein the dual node storage appliance includes at least one shared storage drive, and wherein the method further comprises:
    logically partitioning the shared storage drive into a first virtual storage drive and a second virtual storage drive.

5. The method of claim 4 further comprising:
    sharing the first virtual storage drive between the first virtual storage nodes implemented on the two (2) respective physical multi-core storage nodes; and
    sharing the second virtual storage drive between the second virtual storage nodes implemented on the two (2) respective physical multi-core storage nodes.

6. The method of claim 1 wherein the logically partitioning of the plurality of processing cores into the first domain of processing cores and the second domain of processing cores includes logically partitioning of the plurality of processing cores into a first number of processing cores in the first domain and a second number of processing cores in the second domain, and wherein the first number of processing cores is equal to the second number of processing cores.

7. The method of claim 1 wherein the logically partitioning of the plurality of processing cores into the first domain of processing cores and the second domain of processing cores includes logically partitioning of the plurality of processing cores into a first number of processing cores in the first domain and a second number of processing cores in the second domain, and wherein the first number of processing cores is different from the second number of processing cores.

8. The method of claim 1 wherein the operating of the first virtual storage nodes implemented on the two (2) respective physical multi-core storage nodes includes maintaining one or more processing cores of the respective first domains of processing cores unused.

9. The method of claim 8 wherein the operating of the second virtual storage nodes implemented on the two (2) respective physical multi-core storage nodes includes maintaining one or more processing cores of the respective second domains of processing cores unused.

10. The method of claim 9 further comprising:
    detecting an overload condition at the first virtual storage appliance.

11. The method of claim 10 further comprising:
    in response to detecting the overload condition at the first virtual storage appliance:
        directing the first virtual storage nodes implemented on the two (2) respective physical multi-core storage nodes to start using at least one of the unused processing cores of the respective first domains of processing cores; and
        directing the second virtual storage nodes implemented on the two (2) respective physical multi-core storage nodes to stop using at least one of the unused processing cores of the respective second domains of processing cores.

12. A system comprising:
a memory; and
processing circuitry configured to execute program instructions out of the memory to:
for each of two (2) physical multi-core storage nodes, logically partition a plurality of processing cores into a first domain of processing cores and a second domain of processing cores;
designate the first domain of processing cores of each physical multi-core storage node as being part of a first virtual storage node;
designate the second domain of processing cores of each physical multi-core storage node as being part of a second virtual storage node;
operate the first virtual storage nodes implemented on the two (2) respective physical multi-core storage nodes as a first virtual storage appliance of a virtual federation of storage appliances; and
operate the second virtual storage nodes implemented on the two (2) respective physical multi-core storage nodes as a second virtual storage appliance of the virtual federation of storage appliances.

13. The system of claim 12 wherein the two (2) physical multi-core storage nodes are included in a dual node storage appliance, wherein the dual node storage appliance includes a shared memory, and wherein the processing circuitry is configured to execute the program instructions out of the memory to logically partition the shared memory into a first virtual memory space and a second virtual memory space.

14. The system of claim 13 wherein the processing circuitry is configured to execute the program instructions out of the memory to share the first virtual memory space between the first virtual storage nodes implemented on the two (2) respective physical multi-core storage nodes, and to share the second virtual memory space between the second virtual storage nodes implemented on the two (2) respective physical multi-core storage nodes.

15. The system of claim 14 wherein the dual node storage appliance includes at least one shared storage drive, and wherein the processing circuitry is configured to execute the program instructions out of the memory to logically partition the shared storage drive into a first virtual storage drive and a second virtual storage drive.

16. The system of claim 15 wherein the processing circuitry is configured to execute the program instructions out of the memory to share the first virtual storage drive between the first virtual storage nodes implemented on the two (2) respective physical multi-core storage nodes, and to share the second virtual storage drive between the second virtual storage nodes implemented on the two (2) respective physical multi-core storage nodes.

17. The system of claim 12 wherein the processing circuitry is configured to execute the program instructions out of the memory to maintain one or more processing cores of the respective first domains of processing cores unused, and to maintain one or more processing cores of the respective second domains of processing cores unused.

18. The system of claim 17 wherein the processing circuitry is configured to execute the program instructions out of the memory to detect an overload condition at the first virtual storage appliance.

19. The system of claim 18 wherein the processing circuitry is configured to execute the program instructions out of the memory to, in response to detecting the overload condition at the first virtual storage appliance:
direct the first virtual storage nodes implemented on the two (2) respective physical multi-core storage nodes to start using at least one of the unused processing cores of the respective first domains of processing cores; and
direct the second virtual storage nodes implemented on the two (2) respective physical multi-core storage nodes to stop using at least one of the unused processing cores of the respective second domains of processing cores.

20. A computer program product including a set of non-transitory, computer-readable media having instructions that, when executed by processing circuitry, cause the processing circuitry to perform a method comprising:
for each of two (2) physical multi-core storage nodes, logically partitioning a plurality of processing cores into a first domain of processing cores and a second domain of processing cores;
designating the first domain of processing cores of each physical multi-core storage node as being part of a first virtual storage node;
designating the second domain of processing cores of each physical multi-core storage node as being part of a second virtual storage node;
operating the first virtual storage nodes implemented on the two (2) respective physical multi-core storage nodes as a first virtual storage appliance of a virtual federation of storage appliances; and
operating the second virtual storage nodes implemented on the two (2) respective physical multi-core storage nodes as a second virtual storage appliance of the virtual federation of storage appliances.

\* \* \* \* \*